United States Patent [19]
Greenan

[11] Patent Number: 5,974,771
[45] Date of Patent: Nov. 2, 1999

[54] RAKING APPARATUS

[75] Inventor: Gerard J. Greenan, Ipswich, United Kingdom

[73] Assignee: Ransomes, Sims & Jeffries Ltd., United Kingdom

[21] Appl. No.: 08/913,897

[22] PCT Filed: Mar. 18, 1996

[86] PCT No.: PCT/GB96/00636

§ 371 Date: Dec. 4, 1997

§ 102(e) Date: Dec. 4, 1997

[87] PCT Pub. No.: WO96/28962

PCT Pub. Date: Sep. 26, 1996

[30] Foreign Application Priority Data

Mar. 17, 1995 [GB] United Kingdom .................. 9602337
Feb. 6, 1996 [GB] United Kingdom .................. 9505384

[51] Int. Cl.$^6$ ............................ A01D 51/00; A01D 77/02
[52] U.S. Cl. ........................... 56/16.7; 56/400.02; 56/364
[58] Field of Search ................................ 56/16.7, 400.02, 56/364, 365, 369, 370, 371, 372, 16.4 R, 130, 14.4, 16.1; 460/121, 122

[56] References Cited

U.S. PATENT DOCUMENTS

| | | |
|---|---|---|
| 3,460,629 | 8/1969 | Shapland, Jr. et al. . |
| 3,545,187 | 12/1970 | Whitney ............................ 56/400.02 |
| 3,564,823 | 2/1971 | Rhoads . |
| 4,344,273 | 8/1982 | Jobling et al. . |
| 4,446,681 | 5/1984 | Dynie et al. . |
| 4,467,591 | 8/1984 | Dynie . |
| 4,541,230 | 9/1985 | Huerter . |

FOREIGN PATENT DOCUMENTS

| | | |
|---|---|---|
| 4325825 | 2/1995 | Germany . |
| 1096467 | 12/1963 | United Kingdom . |

*Primary Examiner*—Robert E. Pezzuto
*Attorney, Agent, or Firm*—Harness, Dickey & Pierce, P.L.C.

[57] ABSTRACT

The present invention provides a cylindrical rake for use in a raking apparatus wherein the cylindrical rake comprises first and second end members spaced apart from one another along the axis of the cylindrical rake, a plurality of circumferentially spaced elongated tine carrying members which extend between and are carried by first and second end members mounting devices for mounting the rake on a suitable carriage thereof, and a driven device adapted to be driven for rotating the rake about its axis in use. The tine carrying members carry a plurality of tine elements thereon; characterized in that each tine element is constituted by a length of wire which is formed into two axially spaced coils, a respective neighboring two of the tine carrying members being inserted one each through the two coils for carrying the tine element on the two respective tine carrying members, and each tine element has at least one free end of the wire which extends outwardly of the cylindrical rake for engaging the ground in service. The invention also provides a raking apparatus comprising such a cylindrical rake, a carriage device adapted for translational movement over the ground and a rotating device for rotating the cylindrical rake.

14 Claims, 3 Drawing Sheets

RAKING APPARATUS

The present invention relates to a raking apparatus for raking or scarifying lawns and other fine turf areas such, for example, as golf course greens, tennis courts, bowling greens and cricket creases. The raking apparatus of the present invention can also be used on areas of artificial grass such as that which is available commercially under the trade name ASTROTURF.

In order to maintain a grass lawn or other turfed area in good condition it is necessary regularly to remove from the grass nap any materials which obstruct the flow of air between the individual blades of grass and the underlying soil; the nap must be allowed to "breathe" in order to permit proper drying. Such obstructing materials include patches of moss, debris such as fallen leaves and also blades of grass which grow generally horizontally in the nap. A typical grass lawn may comprise a substantial proportion of grass which grows otherwise than vertically, and such grass can have an injurious effect on the condition of the lawn overall. It is of course also necessary to remove any rotting matter.

These lawn treatments have been traditionally carried out manually using a hand-operated lawn rake of the kind well known in the art comprising a hand-held elongate shaft which carries a rake-head at one end. The head comprises a plurality of elongate tines which are typically disposed in a common plane and splayed outwardly with respect to one another from the end of the shaft. One or more cross-pieces are usually provided to reinforce the tines, and the tines themselves are typically cranked at their extremities for engaging the ground. Traditional hand rakes of this kind are widely used in commercial and domestic gardening, and are generally satisfactory for de-thatching lawns and other grassed areas of moss deposits, and for lifting horizontally growing blades of grass. The use of a traditional hand rake is however very time-consuming, and is therefore not practical for use on very large areas of grass such, for example, as tennis courts and particularly golf courses.

Many tennis courts are now being constructed using artificial grass (e.g. that which is commercially available under the trade mark ASTROTURF) which has a carpet-like construction comprising a flexible backing sheet in which are anchored a plurality of synthetic piles which form a nap. As will be well known to a person skilled in the art, sand is brushed into the nap of artificial grass prior to use. The interstitial spaces between the piles of the grass are filled with the sand to a predetermined depth, such that only the extremities of the piles, remote from the backing layer, project above the layer of sand. In a typical artificial grass assembly, the pile has a length of about 18 mm, and the sand is filled to a depth of about 12 mm, such that about 6 mm of the pile projects above the sand. Of course, the depth of the sand used will vary according to the application for which the artificial grass is required.

A problem associated with the use of artificial grass of the kind described above, is that from time to time the sand in the nap must be replaced. This entails removing the existing sand, and then replenishing the artificial grass with fresh sand. Traditional hand rakes of the kind described above are wholly unsuitable for removing the sand from an area of artificial grass.

U.S. Pat. No. 4,344,273 discloses an automated lawn scarifier which comprises carriage means adapted for translational movement over the ground, particularly natural or synthetic grass, a cylindrical rake mounted on the carriage means for rotation about its axis in juxtaposition with the ground, and rotating means for rotating the cylindrical rake; which cylindrical rake comprises a plurality of elongate tine-carrying members spaced around the circumference of the rake, which tine carrying members carry a plurality of tine elements thereon. Each tine element of the U.S. Pat. No. 4,344,273 scarifier is constituted by a torsion coil spring comprising a single coil and two protruding free ends. A respective one of the tine-carrying members is inserted through the coil of each spring for carrying the tine element on the respective rod. One of the free ends of each tine element extends outwardly of the rake for engaging the ground in service; the other free end is located between another neighbouring tine-carrying member and an axle which extends between the first and second end members on the axis of the rake.

The use of the axle for anchoring the other free end of each tine element against the said other neighbouring tine-carrying member, however, effectively limits the maximum diameter of the cylindrical rake, the number and spacing of tine carrying members, and hence the overall number and density of tines on the cylindrical rake. Further the restriction on the maximum diameter of the cylindrical rake imposes an upper limit on the tine velocity which can be achieved for a given output speed of the rotating means. Not only does this limit the operating efficiency of the scarifier, in terms of the power developed by rotation of the cylindrical rake, but also limits the flux of air through the cylindrical rake which is generated by rotation of the rake; this in turn limits the maximum "throw-speed" of the scarifier. The net effect is that whilst the U.S. Pat. No. 4,344,273 scarifier operates generally satisfactorily for scarifying domestic lawns, it is not suitable for use on a large commercial scale for raking golf greens or the like. Nor is it suitable for removing sand from the nap of artificial grass.

It is an object of at least the preferred embodiments of the present invention therefore to provide an improved raking apparatus which can be used inter alia, for removing stolens, moss and other detritus from grass. In particular it is an object of those embodiments to provide a raking apparatus which can be used for treating large areas of grass such, for example, as golf courses and tennis courts.

It is yet another object of the preferred embodiments to provide a raking apparatus which is sufficiently robust that it is suitable for heavy use, and which can preferably be easily disassembled for repair when necessary.

It is yet another object of the preferred embodiments to provide a raking apparatus which has a sufficient "throw-speed" to make the rake suitable for removing efficiently sand from the nap of an artificial grass.

Accordingly, in one aspect of the present invention there is provided a raking apparatus which is characterised in that each tine element is constituted by a length of wire which is formed into two spaced coils, two respective (preferably neighbouring) tine-carrying members being inserted one each through the two coils for carrying the tine element on the two respective tine-carrying members, and has at least one free end of the wire which extends outwardly of the cylindrical rake for engaging the ground in service.

In another aspect, the raking apparatus is characterised in that respective pairs of tine elements are constituted by opposite ends of a continuous length of wire supported and located by two of the tine-carrying members.

The tine carrying members may be supported by two or more spaced support members positioned for example at the ends of the cylinder and if necessary also intermediately between the ends.

In a different aspect the invention includes a method of raking an area of natural or synthetic grass using a raking apparatus of the present invention.

In some embodiments, a receptacle may further be provided for receiving material raked up by the raking apparatus in service. Said receptacle means may comprise a bin of the kind which is well known in the lawn mower art, which bin is detachably mountable on the front of the carriage in juxtaposition with the cylindrical rake. A throwplate may be provided for deflecting material raked up by the cylindrical rake in service into the bin.

Typically the raking apparatus of the present invention, apart from the cylindrical rake component, may be of similar construction to a conventional lawn mower. The carriage may include one or more wheels or rollers to allow movement of the apparatus over the ground. The carriage may be powered or, in the alternative, may be adapted to be pushed over the ground by an operator. As with conventional lawn mower technology, a powered raking apparatus in accordance with the invention may be electrically powered or may include a motor which is driven by the combustion of a combustible fuel such, for example as a single-stroke petrol engine.

In the case of a non-powered raking apparatus, the rotating means may include a step-up gear mechanism between the wheel(s) or roller(s) of the carriage and the cylindrical rake. Alternatively in the case of a powered raking apparatus, the cylindrical rake may be driven directly by the motor.

The cylindrical rake may be disposed ahead of the carriage wheel(s) or roller(s) in the forward direction of movement of the apparatus, and a height-adjustable roller or wheels may be provided, usually forwardly of the cylindrical rake, to support the cylindrical rake at an adjustable height above the ground.

In another aspect of the present invention, it is envisaged that the cylindrical rake may be adapted for use in an existing lawn mower, in substitution for the cylindrical blade unit. To this end, the present invention specifically includes the cylindrical rake on its own, as well as in combination with the carriage and rotating means, said cylindrical rake further comprising mounting means for mounting the cylindrical rake on the carriage means, and means for drivingly rotating the cylindrical rake in use.

Said support members may each comprise a flat disk which supports the tine-carrying members juxtaposed its periphery. Each tine-carrying member may consist of a rod which is provided at least one end with a releasable fastening means for the supporting end member. The other end of each rod may be welded or otherwise fixedly secured to the other end disk. Alternatively, both ends of the rod may be releasably secured to the end disks. The cylindrical rake may therefore comprise a hollow cylinder defined by the end disks and circumferentially disposed rods; the central shaft may be omitted between the end discs if the structure is made rigid enough. In use, a flow of air is generated between the rods and through the interior of the rake. This flow of air assists in throwing material raked-up by the rake clear of the rake and into the receptacle means if fitted.

In some embodiments the tine carrying members may be skewed with respect to the axis of the cylindrical rake, such that the tines are disposed on a plurality of helical paths around the cylinder.

In yet another aspect of the present invention, a sufficient number of tine elements may be carried on each tine carrying member such that each tine element butts against and is prevented from axial movement with respect to the cylinder by its two neighbouring tine elements. The endmost tine elements may butt against and be held in place by the first and second end members. In this way the cylindrical rake may have a high density of tines, thereby facilitating efficient raking of natural or synthetic grass.

In yet another aspect of the present invention, both free ends of each tine element may extend tangentially to their juxtaposed coil to provide a tine. As each tine element is carried on two spaced tine carrying rods, each tine element is held in place with respect to rotation about the axes of its two respective tine carrying members, and each of the two tines defined by the wire is disposed juxtaposed a respective one of the two neighbouring tine-carrying members.

The two free ends of the wire will usually both subtend an angle with the line between the centres of the two coils. These angles may be the same or different. Preferably each free end will be disposed so as to define an angle between 20–60°, typically about 45°, to the horizontal when its respective tine-carrying member reaches the lowest part of its locus in use.

In another aspect of the present invention there is provided a tine element for a raking apparatus in accordance with the present invention, which tine element comprises a length of wire which is formed into two spaced coils and has at least one free end of the wire which extends tangentially to the juxtaposed coil to provide a tine for raking, which coils are arranged such that their respective axes are disposed substantially parallel to one another and such that these axes are spaced from one another, in a direction orthogonal to the axes, by a distance which is at least equal to the average diameter of the two coils.

Another aspect of the invention provides a tine element for a cylindrical rake, which tine element comprises a length of wire which is formed into two coils spaced laterally of each other, the free ends of the wire each extending from its juxtaposed coil to provide a tine for raking, which coils are arranged such that their respective axes are disposed substantially parallel to one another.

Preferably, when the angle between the tines is $\theta$ degrees, the angle between one tine and a line joining the axes of the coils is $\phi+\theta/_2$ degrees, the angle between the other tine and the line being $\phi-\theta/_2$ degrees, where $\phi$ is the angle made by the tines to the horizontal when in their lowest position after fitting to a rotor as set forth above.

A further aspect of the invention provides a tine-element for a cylindrical rake, which tine element comprises a length of wire which is formed into two coils spaced laterally of each other and has at least one free end of the wire which extends tangentially to the juxtaposed coil to provide a tine for raking, which coils are of substantially equal diameter and are arranged such that their respective axes are disposed substantially parallel to one another.

The two coils of the tine element of the present invention can thus receive two respective tine-carrying members for carrying the element on the cylindrical rake according to the invention, and thereby to prevent rotation of the tine element with respect to said tine carrying members.

The use of spaced end members, tine-carrying embers extending between and carried by the end members, and tine elements which can be threaded onto the tine-carrying members enables a cylindrical rake to be provided which, in accordance with a particular aspect of the invention, may have releasable fastenings between the tine-carrying members and the end members, thereby facilitating ready disassembly and reassembly of the rake as and when required, e.g. in the event of a tine element breaking.

Furthermore, the use of tine elements in accordance with the present invention which have at least two coils for carrying the tine element on two respective tine carrying members means that the cylindrical rake can be made to any practical diameter, and with any suitable number of tine carrying members. This enables the cylindrical rake according to the invention to be constructed with a total number and density of tines, and with a sufficient throw-speed and tine velocity in service, which renders the rake suitable for use on a commercial scale.

Following is a description by way of example only and with reference to the accompanying drawings of methods of carrying the present invention into effect.

Figure 1:
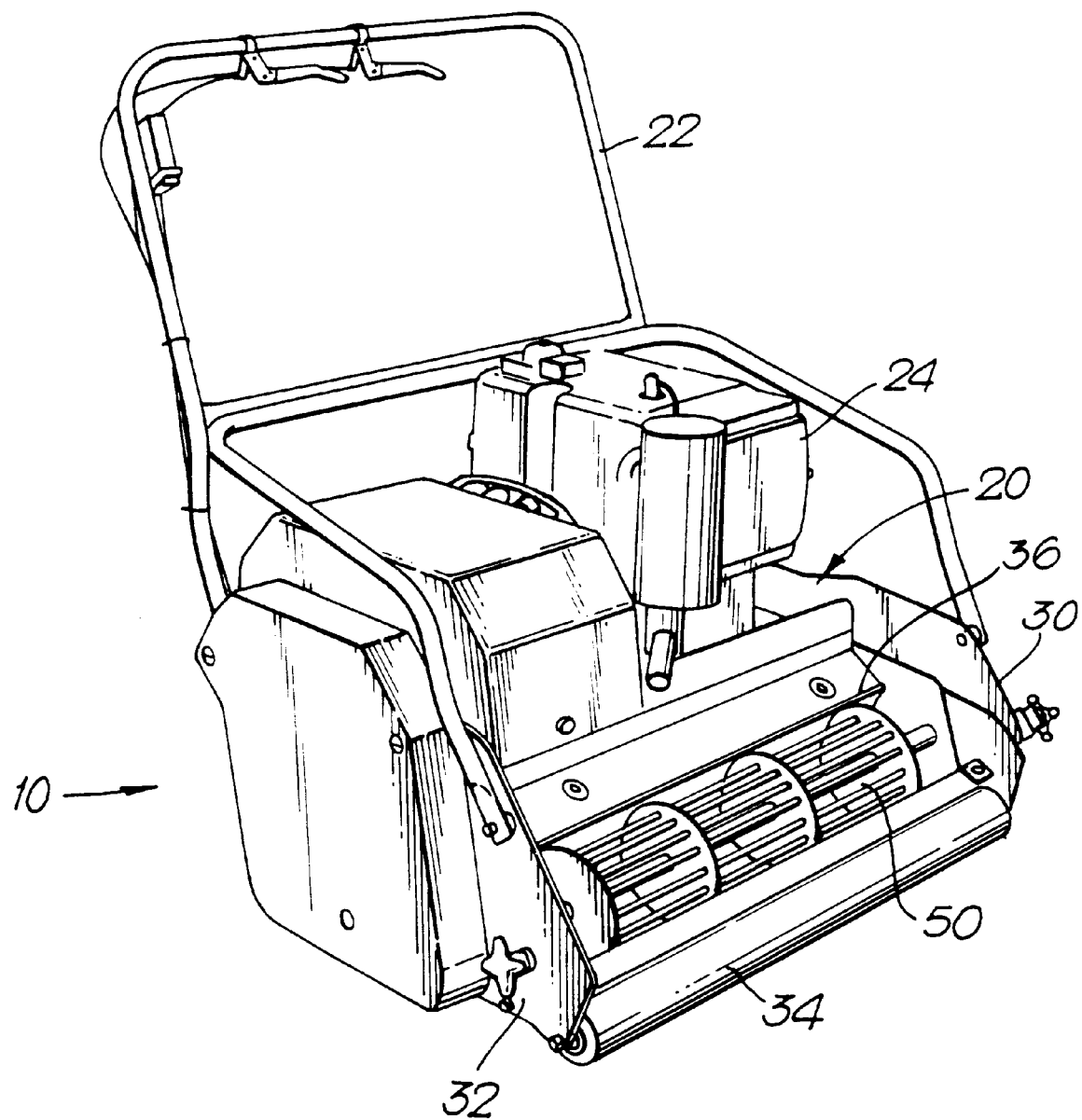
FIG. 1 is a perspective view of a raking apparatus in accordance with the present invention.

A raking apparatus (10) in accordance with the present invention comprises a carriage (20) which is adapted for translational movement over the ground, particularly on a natural or synthetic grass surface. The carriage (20) includes a rear roller (not shown) which supports the carriage off the ground and an upstanding handle (22) for an operator to push the apparatus forwardly and for steering. The carriage supports a single-cylinder petrol engine (24) and a fuel tank (26). Alternatively, an electric motor may be employed, and a flexible cable provided for connecting the electric motor to a suitable supply.

The engine (24) is arranged to drive the roller through a step-down gear mechanism or belt drive (not shown).

Forwardly of the roller, the carriage (20) includes two forwardly extending arms (30, 32) which carry between them a cylindrical rake (50) (shown schematically in FIG. 1).

The cylindrical rake (50) is arranged to be driven by the motor (24) through a step-up gear mechanism or belt drive (not shown) in the same direction of rotation as the rear roller, as the raking apparatus is moved forwardly over the ground.

Forwardly of the cylindrical rake (50), the arms (30, 32) carry between them a height-adjustable forward roller (34) which can be adjusted to space the cylindrical rake (50) at a pre-determined height above the ground. The arms (30, 32) are also adapted to carry a collection bin (not shown) of the kind which is used in conjunction with lawn mowers. The bin includes a wide mouth which, in the fitted position, faces rearwardly in juxtaposition with the cylindrical rake. Behind the cylindrical rake (50), the carriage (20) includes a throw-plate (36) which is shaped to direct material raked up by the drum in service into the bin. The bin is easily detachable from the carriage for emptying. Thus, except as regards the cylindrical rake (50) (to be described hereafter) the apparatus is similar to a conventional motorised cylinder lawn mower.

Said cylindrical rake (50) includes an axle (52) (see FIG. 2) which extends between the two arms (30,32). One end (54) of the axle is splined for engagement with the step-up gear mechanism. The said one end (54) is also formed in an external thread (56) for engagement with a clutch mechanism (not shown).

Figure 2:
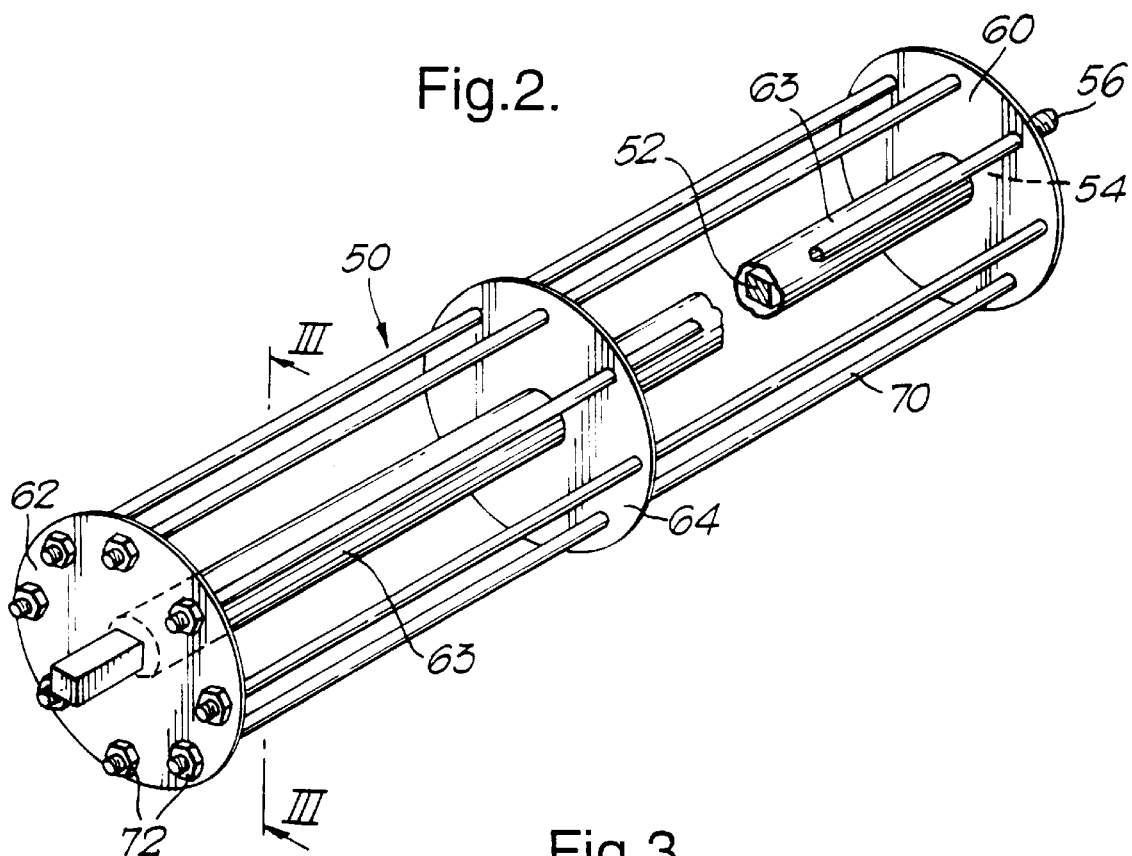
FIG. 2 is a perspective view, partly cut-away, of a cylindrical rake included in the raking apparatus of FIG. 1, with tine elements and three tine-carrying members removed for clarity.

The axle (52) carries two circular end plates (60, 62) at opposite ends of the axle (52) (as shown in FIG. 2) and an intermediate plate (64). Of course, in some embodiments, more than one intermediate plate may be employed. Each of the end and intermediates plates (60, 62, 64) is drilled centrally at (66) to form a square aperture which accommodates the axle (52). The axle (52) is of square cross-section such that it keys in the square apertures (66) of the plates (60, 62, 64). Naturally, rectilinear sections other than square may be used for the axle and corresponding apertures (66) if desired, e.g. hexagonal.

The intermediate plate (64) is located approximately equidistant the end plates (60, 62) by two tubular sleeves (63) as shown in FIG. 2, which tubular sleeves are fitted over the axle (52).

The plates (60, 62, 64) carry between them a plurality of circumferentially spaced intermediate rods (70), of equal diameter, each rod extending between the end plates (60, 62) and passing through holes drilled in juxtaposition with the circumference of the intermediate plate (64). In the embodiment shown in the drawings, eight intermediate rods are used, although again it will be understood that more or fewer may be used as required. Typically, the overall width of the cylindrical rake will be between 1 and 3 feet, typically about 1 ½–2 feet from end to end. The end and intermediate plates (60, 62, 64) may each have an diameter of about 80–140 mm, typically about 110 mm.

Figure 3:
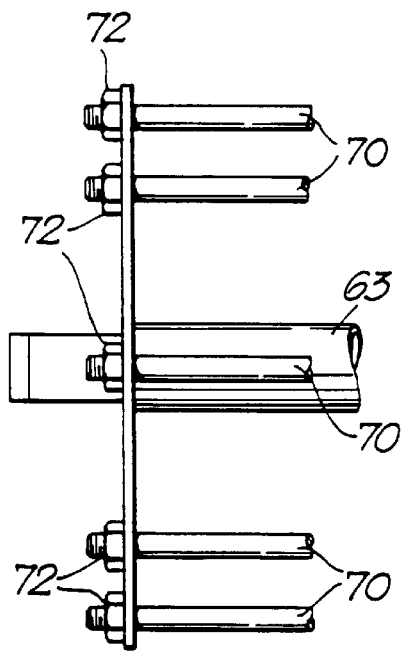
FIG. 3 is side view of a part of the drum rake of FIG. 2, showing an end plate and a plurality of tine-supporting rods.

As shown in FIG. 3, each intermediate rod (70) is threaded at each end and is secured in place by means of lock-nuts (72).

Figure 4:
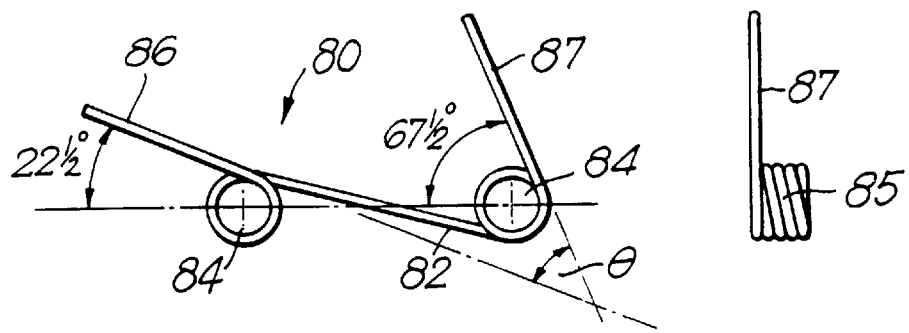
FIG. 4 is an end view of a tine unit in accordance with the present invention.
Figure 5:
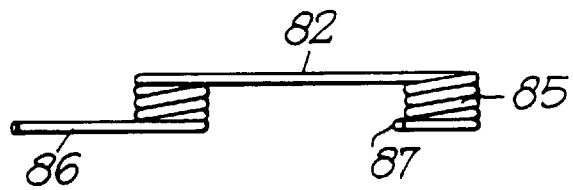
FIG. 5 is a side view of the tine unit of FIG. 4.

With reference to FIGS. 4 and 5 a tine unit (80) in accordance with the present invention is fashioned from a length of resilient wire (82). Said length of wire (82) is formed into two spaced coils (84), each coil comprising a plurality of turns (85)—in the present example each coil includes five turns. This defines an axial thickness of about 7 mm. The internal diameter of each coil (84) is the same as the external diameter of the intermediate rods (70), with a small clearance to allow an intermediate rod (52) to be threaded through the coil (84). The coils are arranged such that their respective axes are oriented substantially parallel to another, and the spacing between the axes of the coils is about equal to the spacing between two neighbouring intermediate rods (70) on the drum rake (50).

The two free ends (86) of the length of wire (82) are arranged to extend circumferentially with respect to their juxtaposed coils (84) as shown in FIG. 4, to form tines. In this embodiment the free ends (86,87) extend such that in use each free end subtends an angle of 45° to the horizontal when the juxtaposed intermediate rod (70) is at the lowest point of its locus. This is achieved by arranging the free ends such that one subtends an angle of 22.5° (45°−22.5°) to the line between the centres of the coils (84), and the other subtends an angle of 67.5° (45 +22.5°) thereto. This latter angle depends on the number of intermediate rods (70) used in the rake, in this case eight. In general, for double-ended tine members 80, the angle θ between the tine ends (86,87) is equal to 360 r/n degrees where n is the number of rods 70 and r is the interval between the rods supporting the tine member, that is for tine members supported on neighbouring rods r=1; if supported on alternate rods r=2, etc. It is preferred, but not essential, that the tines are supported on neighbouring rods.

If the tines are to make an angle of φ to the horizontal at the lowest point, then they must respectively be inclined at φ+θ/2 and φ−θ/2 to the line between the centres of the coils. The angle φ is constant, typically 45°.

The length of each free-end (86,87) will depend on the particular application for which the apparatus is intended. However, in the example illustrated in FIG. 4 which is suitable for scarifying an area of fine turf, the tines may extend outwardly such that, in the true radial direction, they project by about 23 mm. It will be understood that when used on artificial grass, the height of the forward roller will have to be adjusted carefully such that the tines do not impinge on the backing layer which is, in general, easily damaged.

Figure 6:
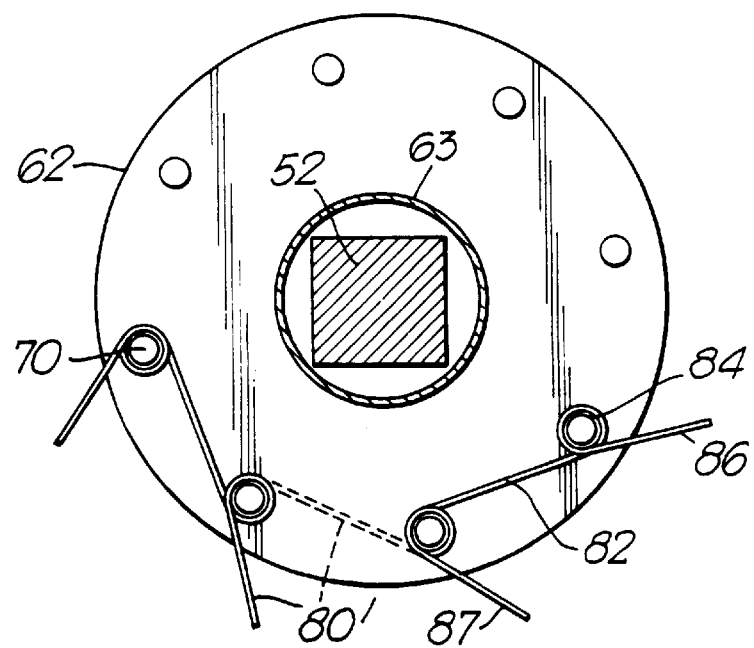
FIG. 6 is a cross-sectional view of the line III—III in FIG. 2, with a number of tine elements shown in the fitted position.

A plurality of tine units (80) of the kind shown in FIGS. 4 and 5 are carried by pairs of neighbouring intermediate rods (52) as shown in FIG. 6. Sufficient tine units (80) are used, such that each tine unit (80) butts against a neighbouring tine unit, and the end-most tine units (80) butt against the end and intermediate plates (60, 62, 64), such that each tine unit is prevented from moving along the intermediate rods (52) in the axial direction of the cylindrical rake (50). In some embodiments, the tine units (80) may be carried on separate pairs of the intermediate rods (52), such that the tine units (80) carried by one intermediate rod (52) are also carried exclusively by one other neighbouring rod (52) as shown by the tine units (80) in full block lines in FIG. 6. Alternatively, the tine units (80) may be distributed on the intermediate rods (52) such, for example, as by each intermediate rod (52) carrying tine units (80) with both of its neighbouring rods (52) as shown by the dashed line (80) in FIG. 6.

In each case, the tine units are carried by the intermediate rods (52), such that the free ends (86) of each unit (80) extend radially outwardly of the cylinder and trail with respect to the rotation of the cylinder (50). It will be calculated that the cylindrical rake (50) hereinbefore described will carry approximately 270 tine units (80), making a total of about 540 tines. The tine density of the cylindrical rake (50) according to the present invention may therefore be in the range 50–150 tines/m$^2$, typically about 110 tines/m$^2$.

In some embodiments, e.g. as shown in FIG. 2, the end and intermediate plates (60, 62, 64) may be arranged one with respect to the others such that the intermediate rods (52) are skewed with respect to the axle (52) of the drum rake (50). In this case, the tine units (80) will be distributed on helical paths with respect to the drum (50). Of course, the present invention also includes the situation where the intermediate rods (70) are not so skewed.

The wire used to form the tine units (80) may be resilient steel wire having a gauge of between 0.5 and 3 mm; advantageously a gauge of between 1 and 2 mm may be used, typically about 1 mm.

The present invention therefore provides a raking apparatus which can be used on natural or synthetic grass. The raking apparatus can be used for treating fine turf areas for removing non-vertically disposed blades of grass, moss and other detritus, or can be used to remove the sand from an area of artificial grass for renovation of the artificial grass. The raking apparatus includes a cylindrical rake which in service is rotated about its axis, and a plurality of tines are carried on a plurality of rode which extend from one end of the cylinder to the other. The tines are defined by tine units (80), each of which tine units (80) is fashioned from a length of wire to form two spaced torsion coils (84). The tine units (80) are carried on the tine-carrying members by means of the coils (84), and this has the effect of preventing rotation of the tine units (80) about their respective supporting tine-carrying members. The cylindrical rake can thus be made to any desired diameter, and with any number and density of tine-carrying member and tine units (80). Large diameter cylindrical rakes according to the invention can be made for commercial use which may include several hundreds of tines, possibly up to one thousand tines, and such large diameter, hollow rakes will generate substantial flows of therethrough in service to provide satisfactory "throw" of raked up material.

The arrangement is robust, and the combination of high tine density and robustness makes the rake of the present invention eminently suitable for use on a commercial scale for treating, e.g golf courses, cricket pitches and the like. Moreover, it has been found that when used on fine turf areas, the raking apparatus of the invention efficiently removes non-upright blades from the nap.

In a different trial, a motorised raking apparatus as hereinbefore described was able to remove the sand from an artificial grass tennis court down to a depth of about 5mm in under 5 hours; this should be compared with the many days which it would take using a traditional lawn rake.

Although the described embodiment of the invention is a pedestrian-controlled machine, the invention is of course equally applicable to other turf-care equipment conventionally provided with cylindrical grass-cutters. Thus it may be embodied in ride-on machines where one or more scarifying cylinders may be provided. Alternatively it may be embodied in a trailed configuration towed behind a tractor, particularly a small low ground-pressure machine such as a garden or green-keeping tractor. Whilst in the described embodiment the scarifying rotor is conventionally driven by a belt from the engine, in more complex embodiments, especially those with multiple rotors, it is convenient to drive the rotors by individual hydraulic motors powered from a hydraulic pump on the tractor or other ride-on machine. Alternatively in towed arrays or small pedestrian units it is possible to drive the rotor or rotors from the ground wheels supporting the carriage in which the rotor(s) is/are mounted, but this in general is unlikely to be the optimum solution because the increased resistance to rotation of the ground wheels may cause skidding, leading to damage to the lawn or green, and also incomplete scarification.

Each feature disclosed in this specification (which term includes the claims) and/or shown in the drawings may be incorporated in the invention independently of other disclosed and/or illustrated features.

I claim:

1. A cylindrical rotary rake for use in a raking apparatus, which cylindrical rake comprises a plurality of elongate tine-carrying members spaced around the circumference of the rake, and mountings permitting mounting of the rake on a suitable carriage for driven rotation about its axis, which tine-carrying members carry a plurality of tine units thereon; each tine unit comprising a pair of tines, wherein respective pairs of tines are constituted by opposite ends of a continuous length of wire supported and located by two of the tine-carrying members.

2. A raking apparatus comprising a carriage adapted for translational movement over the ground, particularly natural or synthetic grass, a cylindrical rake as claimed in claim 1 mounted on the carriage for rotation about its axis in juxtaposition with the ground, and a drive for rotating the cylindrical rake.

3. A raking apparatus as claimed in claim 2, further comprising a receptacle for receiving material raked up by the raking apparatus in service.

4. A cylindrical rake as claimed in claim 1 wherein each tine unit is formed into two spaced coils intermediate its ends, a respective two of the tine-carrying members being inserted one each through the two coils for carrying the tine unit.

5. A cylindrical rake as claimed in claim 4 comprising first and second end members spaced apart from one another along the axis of the cylindrical rake, and supporting the tine-carrying members.

6. A cylindrical rake as claimed in claim 5 wherein said first and second end members each comprise a flat disk which carries the tine-carrying members juxtaposed its periphery.

7. A cylindrical rake as claimed in claim 5 wherein each tine-carrying member consists of a rod which is provided at least one end with a releasable fastener for fastening to the juxtaposed end member.

8. A cylindrical rake as claimed in claim 5, wherein each free end of the wire is arranged so as to define an angle between 20–60°, preferably about 45°, to the horizontal when its respective tine-carrying member reaches the lowest part of its locus in use.

9. A tine unit for a cylindrical rotary rake which tine unit comprises a length of wire which is formed into two coils, each free end of the wire extending from its juxtaposed coil to provide a tine for raking, which coils are arranged such that their respective axes are disposed substantially parallel to and laterally spaced from one another by a distance which is at least equal to the mean diameter of the two coils.

10. A tine unit as claimed in claim 9, wherein when the angle between the tines is $\theta$ degrees, the angle between one tine and a line joining the axes of the coils is $\phi+\theta/2$ degrees, the angle between the other tine and the line being $\phi-\theta/2$ degrees, where $\phi$ is the angle made by the tines to the horizontal when in their lowest position after fitting to a said rake.

11. A tine unit as claimed in claim 9 wherein the two coils are of substantially equal diameter.

12. A tine unit as claimed in claim 9 wherein each tine extends tangentially from its juxtaposed coil.

13. A tine unit as claimed in claim 9 wherein each tine extends from its juxtaposed coil at an angle to a line joining the axes of the coils.

14. A method of raking a lawn or other fine turf area using a cylindrical rake comprising a plurality of elongate tine-carrying members spaced around the circumference of the rake, and mountings permitting mounting of the rake on a suitable carriage for driven rotation about its axis, which tine-carrying members carry a plurality of tine units thereon; each tine unit comprising a pair of tines, wherein respective pairs of tines are constituted by opposite ends of a continuous length of wire supported and located by two of the tine-carrying members.

* * * * *